United States Patent
Pereira et al.

(10) Patent No.: US 9,778,393 B2
(45) Date of Patent: Oct. 3, 2017

(54) METHOD AND SYSTEM FOR DENSITY CORRECTION FOR GEOPHYSICAL WELL LOGGING INSIDE DRILLING RODS

(71) Applicant: VALE S.A., Rio de Janeiro (BR)

(72) Inventors: Wanderson Roberto Pereira, Belo Horizonte (BR); Dionisio Uendro Carlos, Belo Horizonte (BR); Marco Antônio da Silva Braga, Belo Horizonte (BR)

(73) Assignee: Vale S.A., Rio de Janeiro (BR)

(*) Notice: Subject to any disclaimer, the term of this patent is extended or adjusted under 35 U.S.C. 154(b) by 166 days.

(21) Appl. No.: 14/701,223

(22) Filed: Apr. 30, 2015

(65) Prior Publication Data

US 2015/0316679 A1 Nov. 5, 2015

Related U.S. Application Data

(60) Provisional application No. 61/988,810, filed on May 5, 2014.

(51) Int. Cl.
*G01V 5/12* (2006.01)
*G01V 5/04* (2006.01)

(52) U.S. Cl.
CPC ............... *G01V 5/12* (2013.01); *G01V 5/045* (2013.01); *G01V 5/125* (2013.01)

(58) Field of Classification Search
CPC ........ G01V 5/125; G01V 5/101; G01V 5/104; G01V 5/12; G01V 5/045; G01V 5/04
USPC ............ 250/256, 269.3, 269.7, 269.1, 269.2, 250/252.1, 254, 261, 266, 253, 264, 265
See application file for complete search history.

(56) References Cited

U.S. PATENT DOCUMENTS

| | | | | | |
|---|---|---|---|---|---|
| 2,686,881 | A | * | 8/1954 | Herzog | G01V 5/06 250/256 |
| 3,038,075 | A | * | 6/1962 | Youmans | G01V 5/125 250/266 |
| 3,233,105 | A | * | 2/1966 | Youmans | G01V 5/12 250/268 |
| 3,281,599 | A | * | 10/1966 | Baker | E21B 49/005 250/268 |
| 3,292,904 | A | * | 12/1966 | Trubenback | E21B 47/04 242/912 |
| 3,380,714 | A | * | 4/1968 | Martin | E21B 19/09 254/326 |

(Continued)

OTHER PUBLICATIONS

Ellis et al., "Gamma Ray Scattering and Absorption Measurements," Well Logging for Earth Scientists, 2nd ed., Chapter 12, 2007, pp. 289-324, Springer Science+Business Media B.V., Dordrecht, The Netherlands.

*Primary Examiner* — David Porta
*Assistant Examiner* — Blake Riddick
(74) *Attorney, Agent, or Firm* — Arent Fox LLP

(57) ABSTRACT

A method and system for estimating density of material surrounding a borehole in mineral exploration, the method including inserting a tool into a drilling rod located within a borehole, the tool having a gamma radiation source and at least one sensor; raising the tool within the drilling rod; receiving gamma count readings at the at least one sensor; sending the gamma count readings to a computing device; and removing effects of the drilling rod from the gamma count readings at the computing device to calculate a density of material surrounding the borehole.

11 Claims, 9 Drawing Sheets

(56) References Cited

U.S. PATENT DOCUMENTS

| | | | | |
|---|---|---|---|---|
| 3,538,329 A * | 11/1970 | Niven, Jr. | G01V 5/125 | 250/261 |
| 3,617,746 A * | 11/1971 | Janssen | G01V 5/125 | 250/265 |
| 3,654,470 A * | 4/1972 | Wilson | G01V 5/125 | 250/265 |
| 3,693,029 A * | 9/1972 | Niven, Jr. | G01V 5/125 | 250/370.01 |
| 3,701,902 A * | 10/1972 | Janssen | G01V 5/125 | 250/265 |
| 3,860,816 A * | 1/1975 | Wilson | G01V 5/125 | 250/252.1 |
| 4,034,218 A * | 7/1977 | Turcotte | G01V 5/125 | 250/253 |
| 4,048,495 A * | 9/1977 | Ellis | G01V 5/125 | 250/264 |
| 4,297,575 A * | 10/1981 | Smith, Jr. | G01V 5/125 | 250/265 |
| 4,527,058 A * | 7/1985 | Smith, Jr. | G01V 5/06 | 250/256 |
| 4,618,765 A * | 10/1986 | Sonne | G01V 5/125 | 250/269.3 |
| 4,638,158 A * | 1/1987 | Sonne | G01V 5/125 | 250/264 |
| 4,701,868 A * | 10/1987 | Regimand | G01N 23/203 | 250/252.1 |
| 4,814,611 A * | 3/1989 | Moake | G01V 5/12 | 250/266 |
| 5,377,105 A * | 12/1994 | Smith | G01V 5/107 | 702/12 |
| 5,390,115 A * | 2/1995 | Case | G01V 5/125 | 250/266 |
| 5,525,797 A * | 6/1996 | Moake | G01V 5/12 | 250/264 |
| 5,530,243 A * | 6/1996 | Mathis | G01V 5/12 | 250/256 |
| 5,627,368 A * | 5/1997 | Moake | G01V 5/12 | 250/266 |
| 5,659,169 A * | 8/1997 | Mickael | G01V 5/12 | 250/265 |
| 5,910,654 A * | 6/1999 | Becker | G01V 5/12 | 250/267 |
| 2002/0008197 A1* | 1/2002 | Mickael | G01V 5/125 | 250/269.2 |
| 2002/0190198 A1* | 12/2002 | Mickael | G01V 5/125 | 250/269.3 |
| 2005/0234649 A1* | 10/2005 | Calvert | G01V 5/104 | 702/8 |
| 2005/0263692 A1* | 12/2005 | Samworth | G01V 5/125 | 250/269.1 |
| 2010/0252725 A1* | 10/2010 | Stewart | G01V 5/125 | 250/269.3 |
| 2011/0253364 A1* | 10/2011 | Mosse | G01V 5/125 | 166/254.2 |
| 2011/0307179 A1* | 12/2011 | Zhou | G01V 5/125 | 702/8 |
| 2012/0143507 A1* | 6/2012 | Harding | G01V 11/002 | 702/6 |
| 2012/0170405 A1* | 7/2012 | Zharnikov | G01V 1/50 | 367/27 |
| 2013/0066557 A1* | 3/2013 | Forgang | G01V 11/002 | 702/6 |
| 2013/0066560 A1* | 3/2013 | Dyatlov | G01V 7/06 | 702/11 |
| 2013/0261974 A1* | 10/2013 | Stewart | G01V 5/125 | 702/8 |
| 2015/0039232 A1* | 2/2015 | Samworth | G01V 5/045 | 702/8 |
| 2015/0316681 A1* | 11/2015 | Pereira | G01V 13/00 | 250/259 |

* cited by examiner

METHOD AND SYSTEM FOR DENSITY CORRECTION FOR GEOPHYSICAL WELL LOGGING INSIDE DRILLING RODS

CROSS-REFERENCE TO RELATED APPLICATIONS

This application is based upon and claims the benefit of priority to U.S. Provisional Application No. 61/988,810, filed May 5, 2014. The disclosure of the prior application of which is hereby incorporated in its entirety by reference.

FIELD OF THE DISCLOSURE

The present disclosure relates to tools for mineral exploration and operation thereof, and in particular relates to the use and operation of a gamma-gamma tool for mineral exploration.

BACKGROUND

Geological drilling constitutes an important component in the exploration of minerals, including but not limited to the exploration for iron ore. Such drilling provides information on lithologies that compose the geological model used in the estimation of resources and reserves.

In oil exploration, gamma-gamma geophysical well logging is one technique which provides methods for measurement of densities in drilling cores and samples. Such system may also be used for mineral exploration. However, several issues arise. In particular, in mineral exploration friable rock may cause the density measurements to be inaccurate. The removal of a drilling rod used to create the borehole can damage the edges of the borehole.

Further, a logging tool lowered into a borehole without a casing can become trapped down the borehole if the borehole collapses. A logging tool in the oil industry can be abandoned if it becomes stuck, since the oil exploration will never reach the point that the tool was stuck directly. However, in mineral exploration, such as iron ore exploration, the tool may be reached by miners and therefore present a hazard.

BRIEF DESCRIPTION OF THE DRAWINGS

The present disclosure will be better understood with reference to the drawings, in which.

DETAILED DESCRIPTION OF THE DRAWINGS

Figure 1:
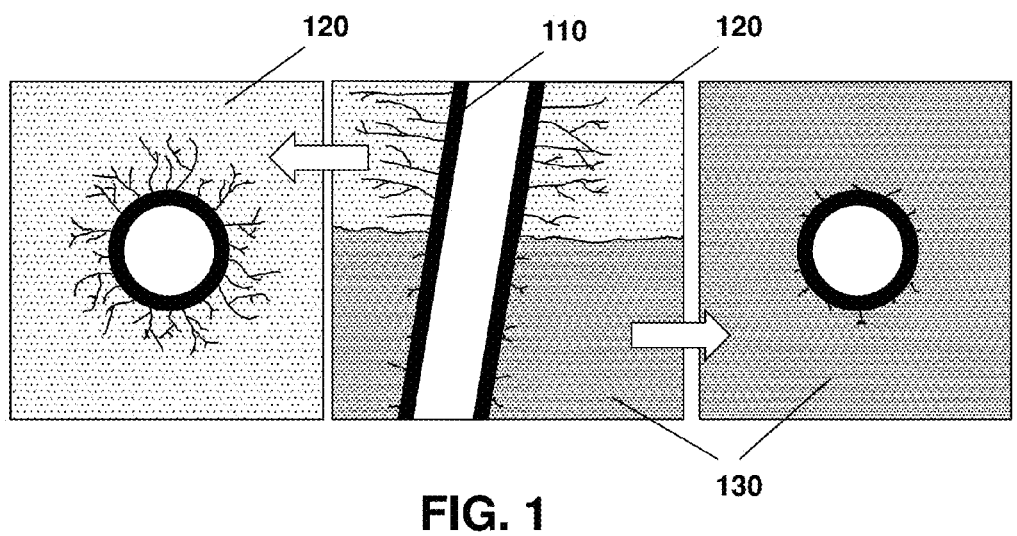
FIG. 1 is a block diagram showing a drilling core extending throughout friable and non-friable material.

The present disclosure provides a method for estimating density of material surrounding a borehole in mineral exploration, the method comprising: inserting a tool into a drilling rod located within a borehole, the tool having a gamma radiation source and at least one sensor; raising the tool within the drilling rod; receiving gamma count readings at the at least one sensor; sending the gamma count readings to a computing device; and removing effects of the drilling rod from the gamma count readings at the computing device to calculate a density of material surrounding the borehole.

The present disclosure further provides a non-transitory computer readable medium for storing instructions which, when executed by a processor of a computing device, are configured to: receive gamma count readings from a sensor of a tool, the tool having a gamma ray source and being raised in a drilling rod within a borehole; determine a combined density from the gamma count readings; and remove effects of the drilling rod from the gamma count readings at the computing device to calculate a density of material surrounding the borehole.

The present disclosure overcomes issues related to uncased boreholes by allowing for density logging inside drilling rods. The logging is done utilizing a caesium-137 source for mineral exploration such as iron ore exploration.

As described below, a set of runs was performed in a double logging of the same hole, both with and without drilling rods. The recovery density found in accordance with the embodiments described below found a significant adherence between the open hole and drilling rod encased hole measured density. In the real world testing the adherence was found to be over 94%.

By running a tool through a drilling rod, it is possible to avoid tool wrecking, and in some embodiments improve productivity and safety by allowing the obtaining of density logs over an entire borehole inside of drilling rods.

Operational Factors

The present disclosure is discussed with regard to iron ore geological drilling operations. However, the disclosure is not limited to iron ore geological drilling and other mineral exploration is possible. For example, operations for the exploration for cobalt or nickel could equally be used with the techniques described below.

In iron ore geological drillings operations, rock compactness is a definitive factor for drilling performance. Rock compactness is associated with future planning stages for mining and mineral processing due to a compact or friable characteristic of the rocks. Friable rocks enable greater drilling progress rate than the compact ones and increase costs and execution time due to greater wear based on abrasion.

The transition from compact rock to friable rock can be abrupt and present an episodic character with one or several occurrences along the borehole. The transition may also have a chronic character, presenting a greater frequency variation along the same borehole.

Due to the compactness and cohesion of each lithology, the drilling rod may induce fracturing in borehole walls.

Such fracturing is greater for friable lithologies having less cohesive rocks, and conversely is lesser for compact and greater cohesive lithologies.

Specifically, reference is now made to FIG. 1. FIG. 1 shows a drilling rod 110 used for drilling a borehole. The borehole is created in a friable lithology 120 and a compact lithology 130.

As seen in the example of FIG. 1, when the borehole is drilled through the friable lithology 120, significant fracturing around the drilling rod occurs.

Conversely, with compact lithology 130, the fracturing is minimal.

The fracturing induced by drilling activity may cause collapses in the borehole walls after the removal of the drilling rods, resulting in a hole locking that may make it impossible to run geophysical well logging tools over the total depth of the borehole drilled. Further, if the collapse occurs during the geophysical logging activity, it may cause logging of geophysical tool in the borehole.

Figure 2:
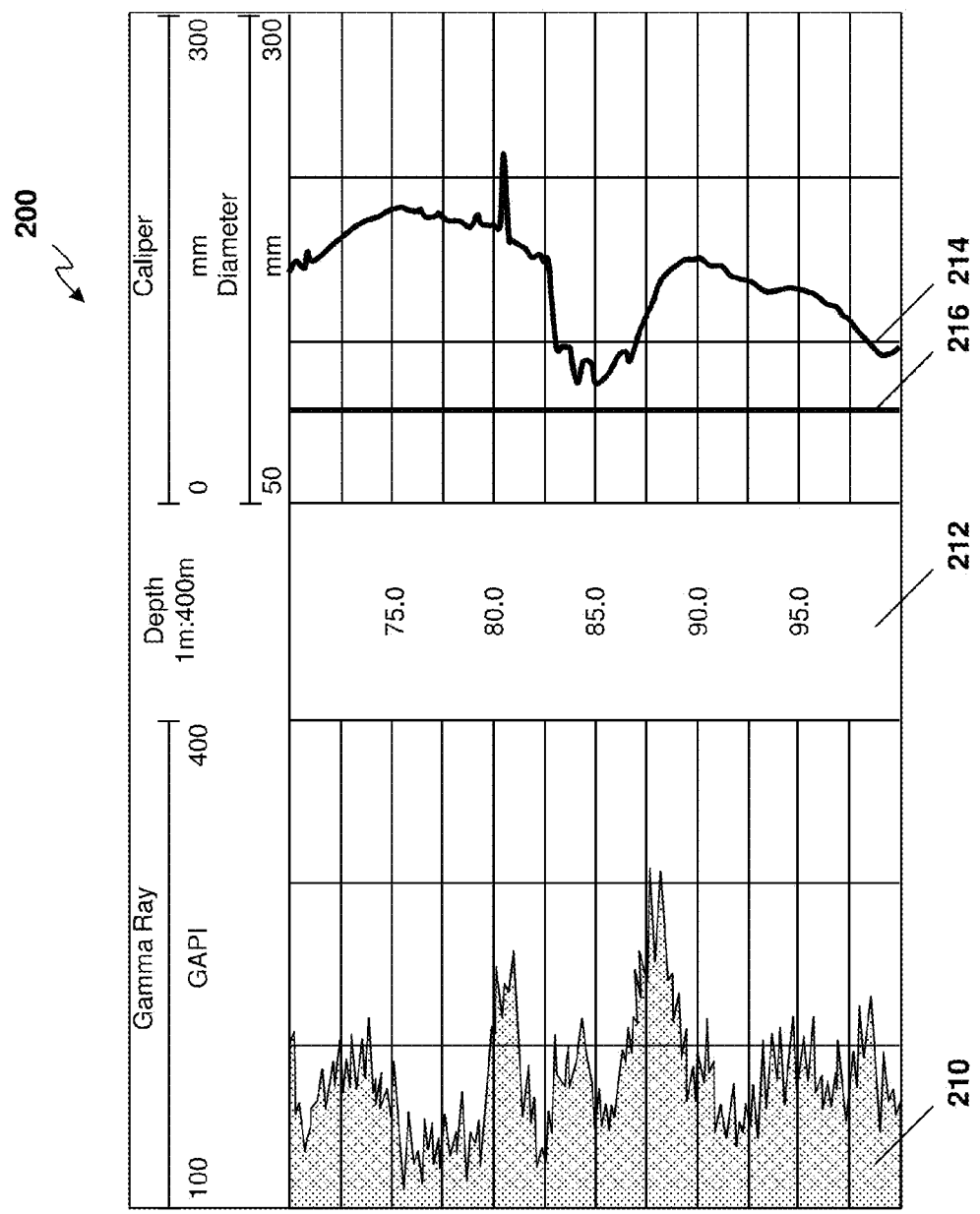
FIG. 2 is a graph showing variations in borehole wall diameter compared with a nominal diameter at a plurality of depths.

An example of well logging in a borehole with poor conditions is shown with regard to FIG. 2. In particular, in FIG. 2 plot 200 includes a gamma ray plot 210 which shows the natural gamma radiation within the hole. Plot 200 further includes a depth chart 212 showing the depth of the reading, as well as a caliper plot 214 showing the diameter of the borehole in comparison with the nominal diameter of the borehole.

In the example of FIG. 2, the caliper measurements in plot 214 show that the diameter of the borehole varies compared with the nominal diameter 216.

The conditions shown with regard to FIG. 2 above provide uncertain conditions for geophysical well logging activity.

Further, even if there is not hole locking, friable lithologies create an irregularity in the hole walls, which may induce proportional variations in density values. Such variations may be based on unconsolidated materials or in diameter variations arising from roughness.

Figure 3:
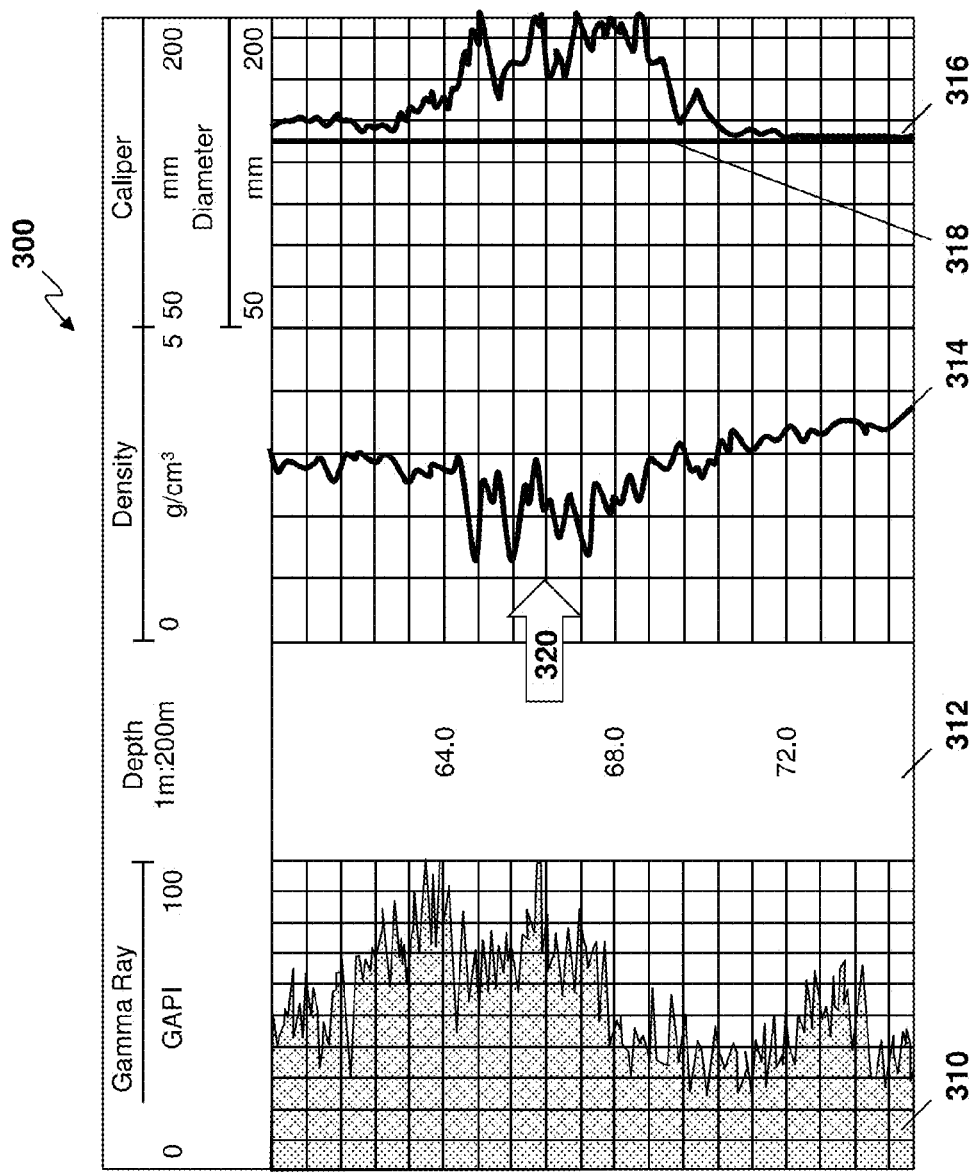
FIG. 3 is a graph showing density measurements, caliper measurements and natural gamma radiation at a plurality of depths in a borehole.

Reference is now made to FIG. 3 which shows a results graph 300. In graph 300, a gamma ray plot 310 provides the natural gamma radiation. Depth plot 312 provides the depth of the hole at which the readings were taken. A density plot 312 provides the density read at the hole at a particular depth. A caliper plot 316 shows the hole diameter when compared with a nominal hole diameter 318.

As seen by arrow 320, a region of density variation is created due to hole enlargement corresponding with an increase in the diameter of the hole, as shown by plot 316.

Figure 4:
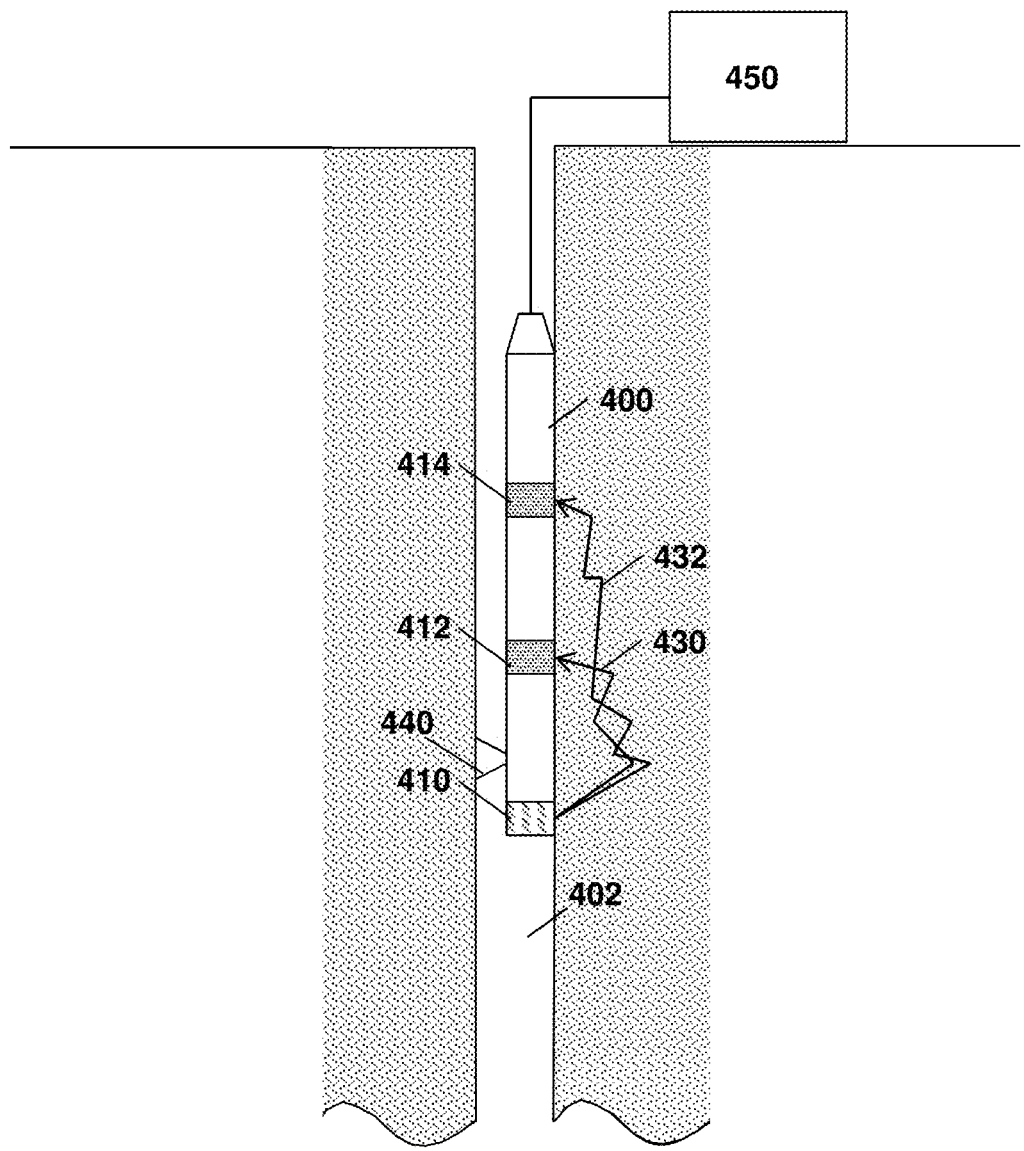
FIG. 4 is a schematic view of a further simplified tool for gamma-gamma well logging.

The plots of FIGS. 2 and 3 may be created by a downhole tool, for example such as that shown in FIG. 4.

In operation, gamma-gamma well logging includes introducing a well logging probe into a borehole. The tool is equipped with a radioactive source and, in practice, at least two receiver sensors for reading the counting per second (CPS) of incident gamma particles. The two sensors have different but known spacing from the source. The two sensors are used for the determination of rock contacts influenced by proximity of such contacts to each sensor.

FIG. 4 shows an example of a probe 400 that may be lowered into a borehole 402. Probe 400 includes a gamma radiation source 410 which has known properties. For example, in one embodiment the source may be caesium-137.

Probe 400, in the example of FIG. 4, includes two sensors, namely short sensor 412 and long sensor 414. The spacing between source 410 and short sensor 412 and long sensor 414 is predetermined and known. However, in other embodiments more than two sensors may be used on a probe 400. Sensors 412 and 414 may be any suitable sensor which can detect the gamma ray beams from source 410 and provide an accurate count.

Source 410 emits gamma ray beams as shown by, for example, gamma ray beams 430 and 432. The various gamma ray beams may be detected, after scattering within the material surrounding borehole 402, by either short sensor 412 or long sensor 414.

Specifically, gamma source 410 provides a gamma ray beam which proceeds into the surrounding material. Some of the gamma ray beams will deflect and be detected by sensors 412 and 414, as shown by beams 430 and 432.

Due to the interaction between gamma particles and the geological material, the counting observed by each of sensor 412 and 414 is attenuated with respect to the counting observed directly from the radioactive source, and the counting is then associated with the density of the geological material in accordance with equation 1 below.

$$N = N_0 e^{-\mu \rho X} \quad (1)$$

In equation 1 above, N is the counting detected on the sensor, $N_0$ is the direct counting emitted from the source, $\mu$ is the mass absorption coefficient, $\rho$ is the material density, and x is the source-sensor distance. Thus from equation 1, as $\mu$, x and $N_0$ are known, the density can be calculated based on the count N received at the sensor.

Knowing the parameters involved in equation 1, it is therefore possible to relate the density values in the material with the values of gamma particle counting at either or both of sensors 412 and 414.

In some embodiments, probe 400 may include a caliper 440 to determine the diameter of the hole. As will be appreciated by those in the art, the hole diameter may vary based on factors such as friable material becoming loose or due to compression reducing the diameter of the hole. Such caliper 440 may further force probe 400 into contact with a wall of borehole 402.

In one embodiment, data from probe 400 is provided to the surface to a data receiver 450 utilizing a communications cable 452. However, other options are possible, including the storing of data on the probe 400 during operation and transferring such data to a computer for processing at a later time. Further, in some embodiments probe 400 may include some processing or pre-processing capabilities to allow for quality control filtering or identification on the probe itself.

Data receiver 450 may be a computer with the capability of conditioning the data. In other embodiments, data receiver 450 may merely record the data for processing at a later time. In the second option, a further computer (not shown) may perform computation on the data provided by probe 400.

In operation, probe 400 may be lowered into a borehole and data readings may be captured as the tool is raised. The depth of the probe would be known generally based on the tool lowering mechanism, and may further be calibrated based on naturally occurring radiation. The rate of ascension of the probe may be set to assure quality readings of the material surrounding borehole 402.

Gamma-gamma well logging operates on a principle based on the property of particles interacting with materials exposed to a gamma ray beam. The density of the material affects the interaction of a particle beam. In particular, the more dense the material, the higher of interaction of particles and thus a lower count of gamma radiation received at a receiver.

Figure 5:
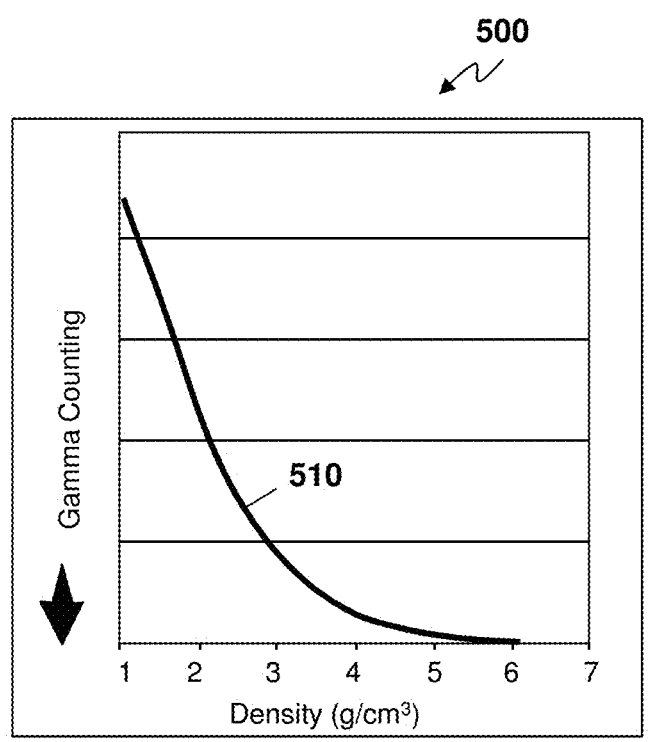
FIG. 5 is a plot showing gamma count readings versus density for a caesium-137 source.

Reference is now made to FIG. 5 which shows a plot 500 expressing the relationship between the density and the count. In particular, as seen in FIG. 5, line 510 provides an exponential decrease in the gamma count as the material gets denser.

In accordance with the embodiments described herein, there is provided a system and process for geophysical well logging in holes with friable material intervals. Specifically, the system and process consist of running the geophysical tool inside a drilling rod. Running the tool inside the drilling rod ensures the integrity of borehole walls during the logging and enhances the quality of the subsequent record of the total logged footage in the borehole.

The use of the tool within the drilling rod provides for reduced risk of loss in hole tools, and productivity enhancements, allowing that the geophysical well logging in friable lithologicies has a performance similar to that of the tool in a compact lithology.

In order to run a tool in the drilling rod, the geophysical well logging may be performed, in one embodiment, at the end of drilling activity but before the removal of the drilling rods. In this case, rod geophysical profiling has an advantage of allowing the tool to slide over a regular surface and also provides a greater exploitation of logged footage due to the containing of potential collapses, allowing the tool to be run through the entire hole. Running the tool in the drill casing further prevents tool loss due to collapse during logging operations.

However, the drilling rod itself represents an uncertainty factor, since the density of the drilling rod is higher than the range of densities expected for the mineralization. Thus, in order to enable the running of the gamma-gamma tool, the effects caused by the influence of the drilling rod in density measurements should be understood and compensated for.

In one aspect of the compensation, the use of a predetermined radioactive source, such as caesium 137, may allow for the correction to be tailored to the specific source count range. While caesium-137 is used in examples herein, the present disclosure is not limited to this source, and other sources could equally be used. For example, cobalt 60 could be used in some embodiments.

Figure 6:
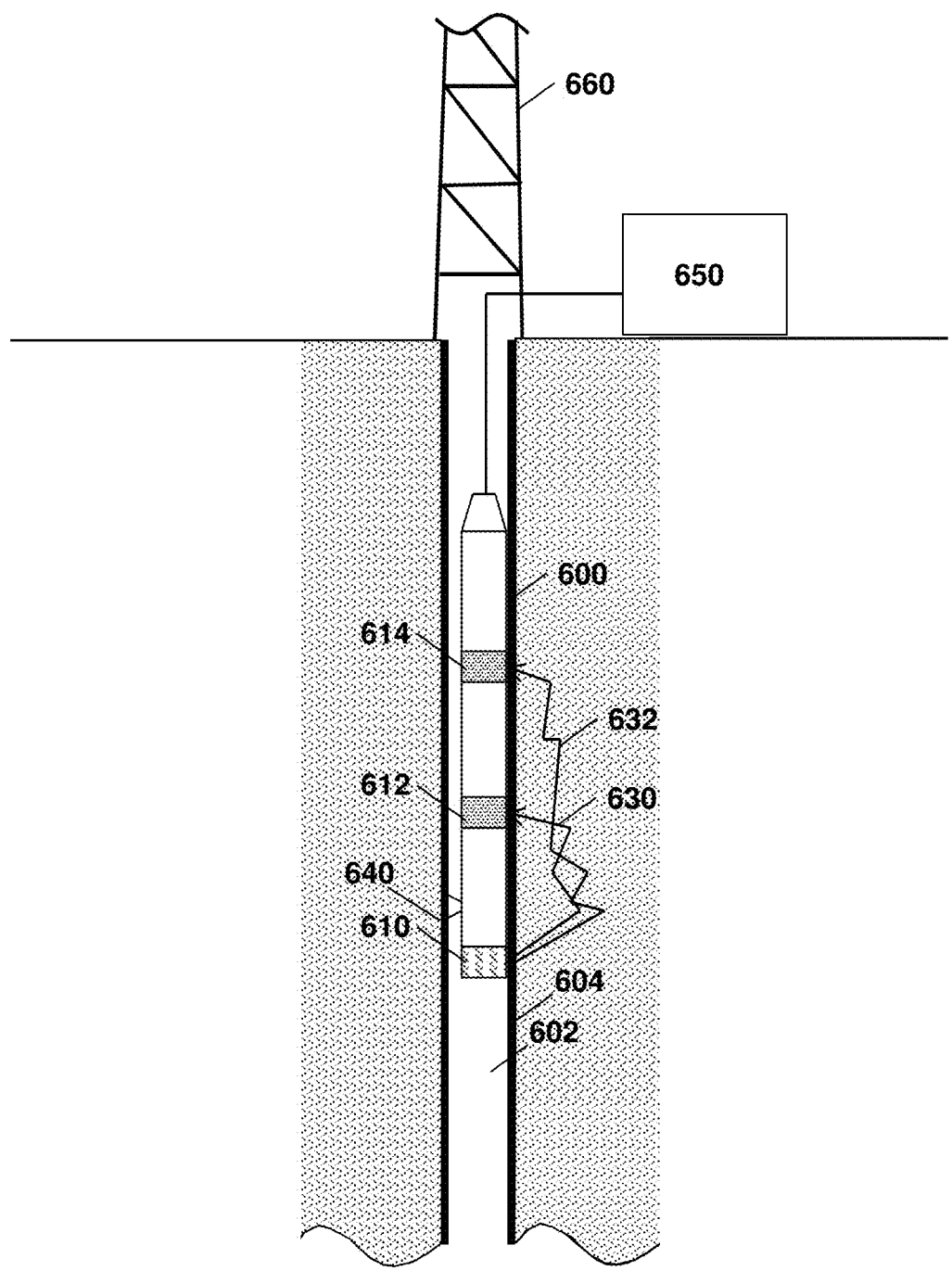
FIG. 6 is schematic view of a further simplified tool for gamma-gamma well logging in a borehole having a drilling rod casing.

Further, in the case of drilling rod well logging, the acquisition geometry described above with regard to FIG. 4 starts being conditioned by the presence of drilling rods between the geophysical well logging tool and the rock mass. Reference is now made to FIG. 6.

As seen in FIG. 6, the gamma-gamma tool 600 still includes the same source 610, and sensors 612 and 614. However, in the embodiment of FIG. 6, the tool 600 is lowered into borehole 602 inside a drill rod 604.

Thus, gamma rays 630 and 632 received by sensors 612 and 614 respectively are conditioned by the drilling rod itself.

Caliper 640 may still be used, in one embodiment, to force the tool into contact with the drilling rod 604. However, in other embodiments, as the diameter of the inside of the drilling rod is known and is uniform, caliper 640 may be omitted.

In the embodiment of FIG. 6, the drilling tower 660 still is part of the site and may be used to lower and raise the tool. Further, a data logging device such as a computer 650 may exist at the surface to capture the results from tool 600.

Figure 7:
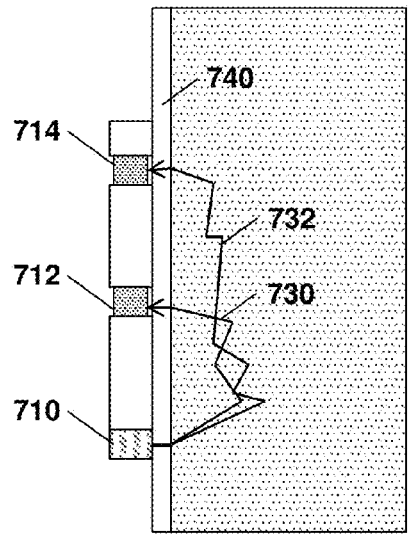
FIG. 7 is an expanded view of gamma ray beams proceeding through a drilling rod, into rock and being received at a plurality of sensors.

Reference is now made to FIG. 7, which shows an expanded view of the tool with source 710 and sensors 712 and 714. In FIG. 7, rod 740 exists between the tool and the rock. The acquisition geometry therefor requires the traversal of the drilling rod in two directions, specifically from the source through the drilling rod into the rock, and then from the rock through the drilling rod to the sensor. Thus, as seen from FIG. 7, the considered average distance between the source and sensors includes a distinct component for the drilling rod, namely the drilling rod density along with a length equivalent to the drilling rod thickness.

Thus, the attenuation of gamma radiation during the acquisition now has two different components, one of them the rock mass, constructed by equation 1 above, and the other dealing with the drilling rod, which may be represented by the equation 2 below.

$$N_1 = N_0 e^{-\mu \rho_h h} \quad (2)$$

In equation 2 above, $N_1$ is the gamma radiation count which crosses the rod; $N_0$ is the radiation count emitted by the source; $\mu$ is the mass absorption coefficient; $\rho_h$ is the drilling rod density and h is the rod thickness.

Figure 8:
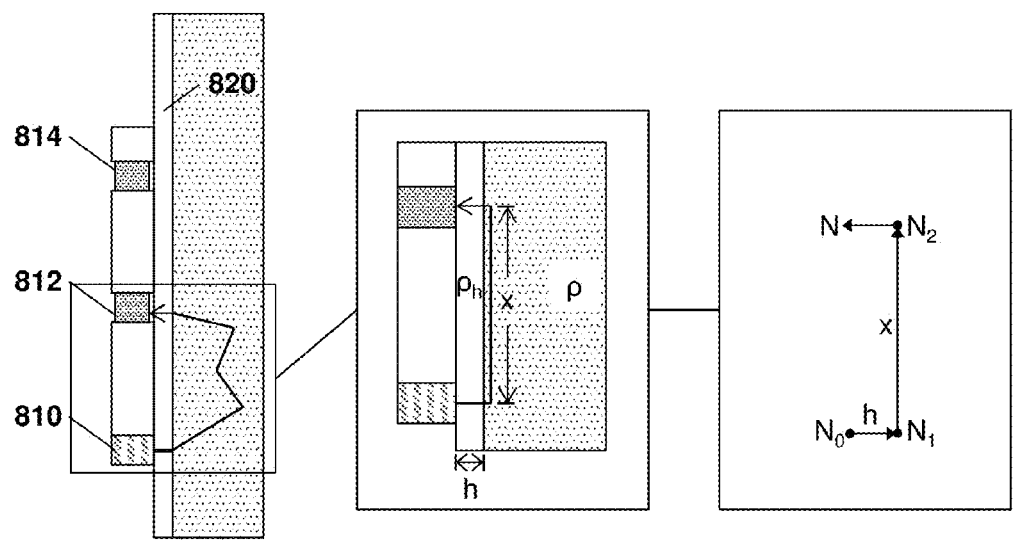
FIG. 8 is a schematic view showing the various components for the traversal of the gamma ray beam of FIG. 7.

Considering the acquisition geometry displayed above with regard to FIG. 7, two ranges may be distinguished with different densities. The first is the range with a rod thickness h, whose density $\rho_h$ corresponds with the rod density. The other is the range with a rock wall having length x, whose density $\rho$ corresponds to the rock mass density. Reference is now made to FIG. 8.

As seen in FIG. 8, a tool has a source 810 and sensors 812 and 814. The source radiation must cross the drilling rod 820. An expanded view within FIG. 8 shows that the drilling rod has a thickness h and a density $\rho_h$ whereas the rock has a density of $\rho$ and the distance between the source and the short sensor is labelled x.

In FIG. 8, based on the relative attenuation of gamma radiation described in equations 1 and 2 above, it is possible to relate different API counting values in different points of the design, due to the presence of the rod, as well as the rock mass, into the approximate path covered by the gamma radiation from source to sensor.

From equation 2 above, considering that $N_0$ is the direct counting at the source, the attenuation caused by the rod decreases the count to a value $N_1$. The same effect occurs at the point where the gamma radiation with an initial count $N_1$ turns into $N_2$, which counts the particles traveled a distance x through the rock mass with a density $\rho$.

Finally, the sensor will record a density $\rho_1$, which is the composition between the stone and rod density. Such density is conditioned by the acquisition geometry.

Taking into account FIG. 8, density correction may be made for measurements inside the drilling rod. Considering that a bulk density $\rho_1$ read by the sensor in a hole with drilling rods from equation 1, equation 3 is produced.

$$\rho_1 = \frac{-\ln \frac{N}{N_0}}{\mu x} \quad (3)$$

Thus equation 3 is merely equation 1 in which the composite density $\rho_1$ is used, and the equation is rearranged to isolate $\rho_1$.

Considering the acquisition geometry described with regard to FIG. 8, three interaction steps may be distinguished with regard to the interaction of the radiation with the drilling rod. The first step is described by equation 2 above. The second step, which is the gamma radiation API count that is mitigated by the bulk formation with density $\rho$, results in equation 4 below.

$$N_2 = N_1 e^{-\mu \rho x} \quad (4)$$

Thus equations 4 is merely equation 1 for the interactions that occur outside the drilling rod.

The third step in the calculation is that in which the $N_2$ count will once more be lessened by the rod, resulting in N bulk counting at the sensor.

Equation 5 relates to the $\rho_1$ bulk density read by the sensor.

$$N = N_2 e^{-\mu \rho_1 h} \qquad (5)$$

As seen in Equation 5 above, it is again a substitution of equation 1 for the density $\rho_1$ using a count attenuation from $N_2$ to N.

Substituting equations 2 and 4 into equation 5 produces equation 6 below.

$$N = [(N_0 e^{-\mu \rho_h h}) e^{-\mu \rho x}] e^{-\mu \rho_1 h} \qquad (6)$$

Solving for equation 6, this results in the simplification of equation 7 below.

$$N = N_0 e^{-\mu \rho x} e^{-\mu h (\rho_1 + \rho_h)} \qquad (7)$$

From equation 7, if the densities are isolated then equation 8 is reached.

$$\frac{-\ln \frac{N}{N_0}}{\mu x} = \rho + h(\rho_1 + \rho_h)/x \qquad (8)$$

As seen in equation 8 above, the term is the same as that in equation 3 above. Thus, replacing equation 3 into equation 8 and isolating the required $\rho$ density results in equation 9.

$$\rho = \rho_1 - h(\rho_1 + \rho_h)/x \qquad (9)$$

From equation 9, $\rho_1$ is the density read by a sensor such as the short sensor, h is known, x is known, and $\rho_h$ is known. Therefore, the density read by the sensor can be corrected to the remove the effects of the drilling rod and thus provide the density of the rock.

From the equations above, based on known geometries of sensor versus source, densities and thicknesses of drilling rods, the tool may be run through a drilling rod and the drilling rod compensated for, thereby producing a value for the density of the rock behind the drilling rod.

Test results in drilling holes confirm the correction results. Specifically, in order to check the correction equation, data from a drilling hole was found using two passes of the tool. In a first pass the tool was run utilizing the drilling rod and in the second pass the drilling rod was removed and the tool was run in the hole without a casing.

Figure 9:
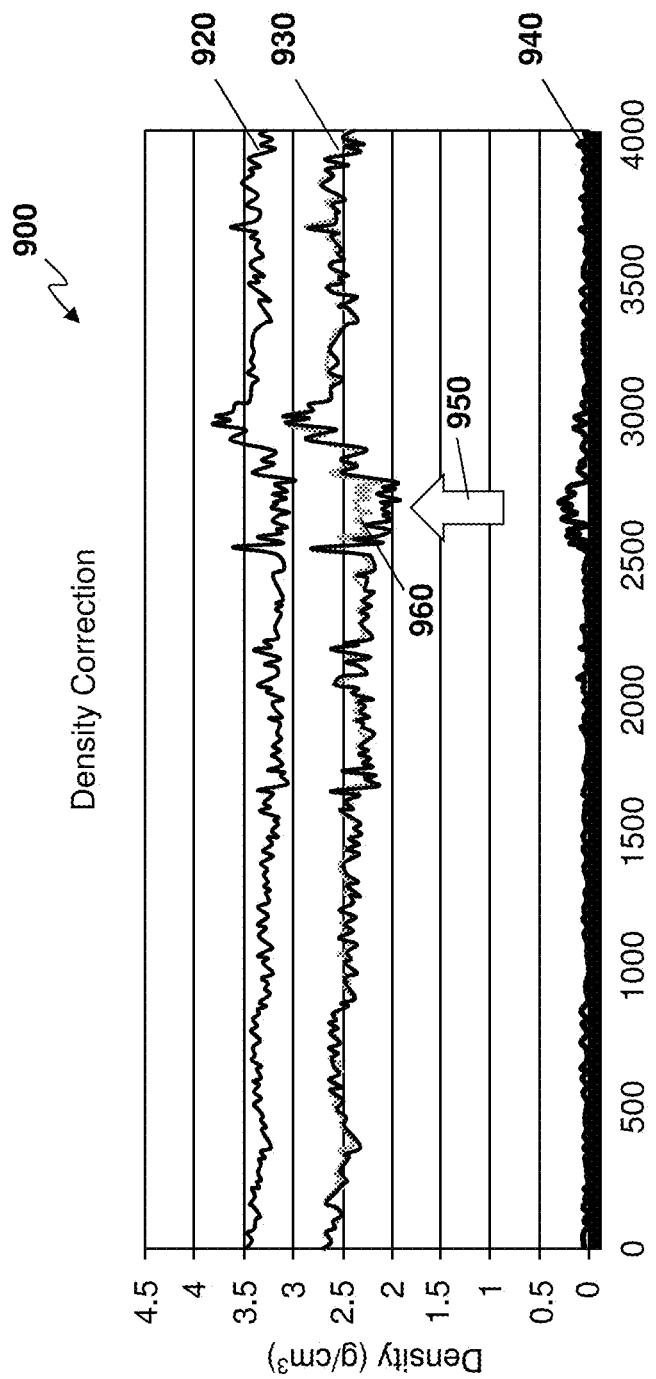
FIG. 9 is a graph showing density measurements in a cased hole and an uncased hole, along with residuals and error correction.

Reference is now made to FIG. 9, which shows a graph 900 having the results of the density measurements of a borehole. The results are for the same borehole, which was run cased with the drilling rod and uncased after the drilling rod was removed.

For the cased borehole, a line 920 is shown representing density measurements of the rock. The results for the density measurements on the uncased hole are provided utilizing line 930.

Further, the open (uncased) hole line 930 may be corrected utilizing the techniques as described in applicant's U.S. provisional application No. 61/988,810 filed May 5, 2014, the contents of which are incorporated herein by reference.

A residual plot for the uncased run, using a tool with two sensors, is shown by line 940 in FIG. 9. Line 940 shows a high residual in the area of 950. This high residual area may be caused by, for example, a wall collapse during drilling rod removal, leading to residuals that are systematically higher.

Utilizing this residual data, a corrected line 960 may be produced, taking into account the residuals.

From FIG. 9, plot 900 provides a trend between the corrected density values and the open hole density values in which the upper density values are increased and the lower density values are decreased for the data in question without significantly impacting the residual values. Thus, from FIG. 9, for a hole in question, correcting the densities is useful since it recovers a good approximation of the bulk density values distorted by the presence of the drilling rods.

Furthermore, in the event of a drilling wall collapse that is pre-existent, this may be detected by quick quality control through analysis of differences between the density measurements recorded on the short and long space sensors. Such factor collaborates the increase in residues relating to greater recorded density values, showing the possibility of a confidence range where corrections are more effective.

Considering gamma radiation attenuation curve includes an increase in density displayed in FIG. 5, a confidence range may be outlined for the density measurements to which the correction imposes a displacement, as the measurement using drilling rods follows the same API count times density relationship which remains after applying the correction.

Therefore, a difference in density surrounding a high density value recorded in measurements of cased hole implies a subtle difference in counts, which may exceed the confidence range or the API count times density relationship.

Similarly, very low density values, measured in cased holes, are forced into the confidence range, whereas the rock density itself may lie lower than such range. Consequently, a reduced confidence range in relation to the observed values for open hole density measurements may exist for very low densities such as that in sedimentary coal exploration environments. Further, a reduced confidence range may exist for very high densities which are greater than those found in mineral exploration such as iron ore exploration.

As a control measure, a correlation between density logs and the geological descriptions of drilling holes may be used, as well as conventional density data and data from petrophysical scanners in addition to the quality control of gamma-gamma density values.

The above therefore provides for methods and tools to use in gamma-gamma geophysical well logging within a drilling rod, including correction for the effects of the drilling rod.

The computing device on which the methods described above is implemented may be any computing device. One example of a simplified computing device is provided with regards to FIG. 10.

Figure 10:
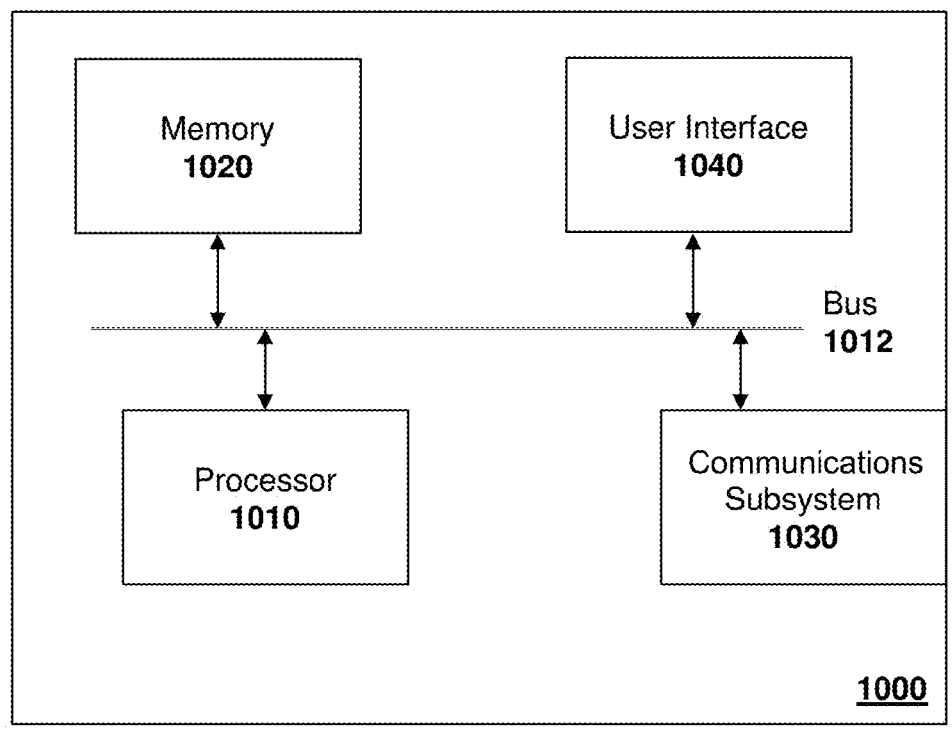
FIG. 10 is a simplified block diagram of an example computing device capable of being used with the system of the present disclosure.

FIG. 10 is a block diagram of a computing device 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 1000 may comprise a processor 1010 that interacts with a user interface 1040 having one or more input/output devices, such as a speaker, microphone, mouse, touchscreen, keypad, keyboard, printer, display, and the like.

The computing device may include one or more processors 1010, memory 1020, and communications subsystem 1030 connected to a bus 1012.

The bus 1012 may be one or more of any type of several bus architectures including a memory bus or memory controller, a peripheral bus, video bus, or the like. The processor 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The memory 1020 may further comprise any type of storage device configured to store data, programs, and other information and to make the data, programs, and other information accessible via the bus. Memory 1020 may comprise, for example, one or more of a solid state drive, hard disk drive, a magnetic disk drive, an optical disk drive, or the like.

The user interface 1040 may be used to couple external input and output devices to the processing unit. Examples of input and output devices include a display coupled to a video adapter, a mouse/keyboard/printer coupled to an I/O interface. Other devices may be coupled to the processing unit, and additional or fewer interface cards may be utilized. For example, a serial interface such as Universal Serial Bus (USB) (not shown) may be used to provide an interface for a printer, and an input may be provided for probe 600 data.

The computing device 1000 may also a communications subsystem 1830, which may comprise wired links, such as an Ethernet cable or the like, and/or wireless links to access nodes or different networks. Such communications subsystem 1030 would allow the computing device to communicate with remote units via the networks. For example, the communications subsystem 1030 may provide wireless communication via one or more transmitters/transmit antennas and one or more receivers/receive antennas. In an embodiment, the computing device 1000 is coupled to a local-area network or a wide-area network for data processing and communications with remote devices, such as other processing units, the Internet, remote storage facilities, or the like.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method for estimating density of material surrounding a borehole in mineral exploration, the method comprising:
    inserting a tool into a drilling rod located within a borehole, the tool having a gamma radiation source and at least one sensor;
    raising the tool within the drilling rod;
    receiving gamma count readings at the at least one sensor;
    sending the gamma count readings to a computing device; and
    calculating, via the computing device, an estimated density $\rho$ of the material surrounding the borehole, wherein the estimated density $\rho$ of the material surrounding the borehole is calculated based on:

$$\rho = \rho_1 - h(\rho_1 - \rho_h)/x$$

where $\rho_1$ is a density based on readings at the sensor, h is a wall thickness of the drilling rod, $\rho_h$ is a density of the drilling rod, and x is the distance between the gamma radiation source and the sensor.

2. The method of claim 1, wherein the tool is raised at a predetermined rate.

3. The method of claim 1, wherein the raising is done utilizing a pulley system connected to a drilling tower.

4. The method of claim 1, further comprising calibrating the tool by running the tool through the borehole a second time after the drilling rod has been removed from the borehole.

5. The method of claim 1, wherein the radiation source is selected to provide unique readings for a lithology of the borehole.

6. The method of claim 1, further comprising defining a confidence range for densities based on lithological information and drilling rod compensation.

7. The method of claim 1, wherein the tool has a single sensor.

8. A non-transitory computer readable medium for storing instructions which, when executed by a processor of a computing device, are configured to:

receive gamma count readings from a sensor of a tool, the tool having a gamma ray source and being raised in a drilling rod within a borehole;

determine a combined density from the gamma count readings; and calculate an estimated density ρ of the material surrounding the borehole, wherein the estimated density ρ of the material surrounding the borehole is calculated based on:

$$\rho = \rho_1 - h(\rho_1 - \rho_h)/x$$

where $\rho_1$ is a density based on readings at the sensor, h is a wall thickness of the drilling rod, $\rho_h$ is a density of the drilling rod, and x is the distance between the gamma ray source and the sensor.

9. The non-transitory computer readable medium of claim 8, wherein the tool has a single sensor, the instructions being further configured to compensate for density readings based on the counting values read by the sensor.

10. The non-transitory computer readable medium of claim 8, wherein the instructions are further configured to calibrate density measurements for the tool by receiving gamma counts from running the tool through the borehole a second time after the drilling rod has been removed from the borehole.

11. The non-transitory computer readable medium of claim 8, wherein the instructions are further configured to define a confidence range for densities based on lithological information and drilling rod compensation.

* * * * *